3,017,338
ELECTROLYTIC PROCESS AND APPARATUS
Clarence A. Butler, Jr., East Cleveland, and Christopher C. Silsby, Jr., Euclid, Ohio, assignors to Diamond Alkali Company, Cleveland, Ohio, a corporation of Delaware
Filed Mar. 3, 1958, Ser. No. 718,561
13 Claims. (Cl. 204—98)

This invention relates to the production of alkali metal hydroxides and halogens from concentrated alkali metal halide solutions, and more particularly relates to a method and an apparatus for the electrolysis of a concentrated alkali metal halide solution in an electrolytic cell employing a cation permselective membrane. Specifically the invention contemplates a process and apparatus for producing an aqueous solution of alkali metal hydroxide, elemental halogen, and hydrogen gas, in a three-compartment electrolytic cell comprising an anode compartment, a center compartment, and a cathode compartment, the anode compartment being separated from the center compartment by a fluid permeable porous diaphragm, and the center compartment being separated from the cathode compartment by a cation permselective membrane.

The term "cation-permselective" membrane is understood to refer to a fluid impermeable, ion permeable membrane having a higher cation transport number through the membrane itself than through the solutions adjacent thereto. For example, a 5 N sodium hydroxide solution will have a cation transport number of 0.15 and an anion transport number of 0.85. Thus a membrane having a cation transport number above 0.15 in this solution is termed cation-permselective in this solution. Examples are polystyrene sulfonates (U.S. Patent 2,731,411) which exhibit cation transport numbers of about 0.25 in this solution, and carboxylate polymers (U.S. Patent 2,731,408) which exhibit cation transport numbers between about 0.45 and 0.75 in this solution. Preferably the permselective membrane is a copolymer containing carboxyl groups (—COO— or —COOH) fixed in the polymeric matrix.

The term "alkali metal" as used herein is intended to refer to the alkali metals, lithium, sodium, potassium, rubidium and cesium, and the term "halide" is intended to refer to the chloride, bromide, and iodide salts of the alkali metals.

Electrolysis of electrolytic solutions in three-compartment cells wherein permselective membranes separate the compartments is well known. However, in such a cell where alkali metal hydroxide is produced from a concentrated alkali metal halide solution fed to the center compartment the anode is substantially attacked by oxygen in the electrode reaction products and the cell operates at low current efficiencies. It is also known to employ a plurality of compartments in an electrolytic diaphragm-type cell for the electrolysis of concentrated alkali metal halide solutions, or brines, the compartments of such cells being defined by asbestos or other liquid permeable diaphragms. However, the fluid permeable diaphragms permit flow of electrolyte solution from one compartment to another thereby contaminating the alkali metal hydroxide produced in the cathode compartment.

Caustic soda, commercially the most important of the alkali metal hydroxides, is presently manufactured by the electrolysis of sodium chloride brine in two principal types of apparatus, the diaphragm cell and the mercury cell. In the United States diaphragm cells predominate in the production of both caustic and chlorine, but mercury cells have become increasingly popular in recent years.

In a typical two chamber diaphragm cell of types well known, a fluid-permeable asbestos diaphragm overlaying a foraminous metal cathode member permits the flow of brine from anode chamber to cathode chamber and prevents intermixing of the products formed at the electrodes, and direct current is passed through the cell producing chlorine at the anode, and hydrogen and sodium hydroxide at the cathode. The so-called "cell liquor" or catholyte withdrawn from the cathode compartment normally contains about 10–11% sodium hydroxide and 15–16% unreacted sodium chloride. The sodium chloride is separated from the caustic soda by concentrating the cell liquor to a 50% solution of sodium hydroxide, at which concentration the sodium chloride crystallizes out. Further cooling and filtering reduce the sodium chloride concentration to about 1% by weight of the solution, which is referred to in commerce as "diaphragm grade" caustic soda. Additional treatment and purification processes are employed to remove the remaining sodium chloride, sodium chlorate, and iron impurities resulting in a high purity caustic soda solution known as "rayon grade" caustic soda.

The mercury cell is receiving increased attention for new caustic-chlorine installations because the caustic soda produced has very small amounts of impurities which places it in the category of "rayon grade" caustic soda. In a typical mercury cell, sodium chloride brine is electrolyzed between a graphite anode and a flowing mercury cathode. A sodium amalgam formed at the cathode is withdrawn from the cell to a "denuder" wherein the sodium of the amalgam is reacted with water to form hydrogen gas, and a caustic soda solution.

Both diaphragm and mercury cells have inherent advantages and disadvantages. Diaphragm cells require less floor space per unit of productive capacity and produce caustic soda at a cost lower than mercury cells, are simple to operate, rugged, and very efficient in power consumption per ton of product, which power consumption is less than in a mercury cell. Several disadvantages are inherent in diaphragm cells, however, in that the caustic soda is not as pure as that manufactured in mercury cells, and evaporation and purification systems are needed to eliminate salt and other impurities. Also, there is the undesirable migration of hydroxyl ions from the cathode compartment to the anode compartment of a diaphragm cell which contributes to the oxidation of graphite anodes by the formation of hypochlorite which is oxidized to chlorate, which results also in contamination of the caustic soda with sodium chlorate. In addition, the influent brine to diaphragm cells must be purified to eliminate calcium that might clog the fluid permeable diaphragms.

Mercury cells, on the other hand, produce caustic soda of a purity higher than that attainable by diaphragm cells. Since there are no diaphragms that are subject to clogging in the mercury cells, high concentrations of calcium in the input brine are tolerable. The chlorine produced in a mercury cell is free from contamination by anode impregnating materials that are used in diaphragm cell anodes. Despite the production of a pure caustic soda, the mercury cell has disadvantages that have militated against its widespread use. Power consumption and floor space per unit of product are high, as is initial capital investment which exceeds that in a diaphragm cell, and mercury losses in operating a mercury cell increase the unit cost of product.

It is an object of this invention to provide an apparatus and method for obtaining high purity alkali metal hydroxide, and halogen, from an alkali metal halide solution, in a more efficient, economical manner than is possible by present methods and apparatus.

It is also an object to provide a method and apparatus for the manufacture of both high purity caustic soda and lower purity caustic soda in the same electrolytic cell thereby reducing capital expenditure.

Another object of this invention is to provide a method and apparatus which prevents migration of hydroxyl ions into the anode compartment and prevents transfer of chlorine into the cathode chamber of a caustic-chlorine cell.

Another object of this invention is to prevent corrosion of the anode in a caustic cell by chemical reaction of electrode products.

These and other objects will be apparent to those skilled in the art from the description which follows.

Pursuant to these objects, the present invention is directed to a three-compartment electrolytic cell for the electrolysis of concentrated alkali metal halide solutions from which are obtained elemental halogen, alkali metal hydroxide of a high degree of purity, equivalent to that produced by the mercury cell, and an alkali metal hydroxide solution, equivalent to the "cell liquor" (catholyte) of a diaphragm cell, said electrolytic cell comprising an anode compartment and a cathode compartment separated by a central compartment, a fluid permeable porous diaphragm separating the anode compartment from the center compartment, a cation permselective membrane separating the center compartment from the cathode compartment, means for introducing a concentrated solution into said anode compartment, means for withdrawing electrolytic solution from said central compartment, means for introducing water into said cathode compartment, means for withdrawing alkali metal hydroxide solution from said cathode compartment, and means for supplying direct current to said cell.

It will be appreciated by those skilled in the art that while the hydroxides of the alkali metals as a class are disclosed as useful in the practice of the present invention, the commercially important alkali metals at present are sodium and potassium, and of the hydroxides of these metals, sodium hydroxide is commercially produced in the largest tonnage. Similarly while the alkali metal halides are disclosed as a class, sodium and potassium chloride are the commercially important members, and of these sodium chloride is employed to the greater extent.

Accordingly, the method and apparatus of the invention will be more specifically described hereinafter in terms of the electrolysis of concentrated sodium chloride solutions, referred to in the art as brine.

In operating the apparatus of the invention concentrated sodium chloride brine is fed into the anode compartment; the brine, under hydrostatic pressure, flows through the fluid permeable diaphragm into the center compartment; the sodium ions pass through the cation permselective membrane into the cathode compartment wherein they are converted to sodium hydroxide which is withdrawn from the cathode compartment. The effluent from the center compartment is a solution of sodium hydroxide and sodium chloride, characteristic of the catholyte effluent from a diaphragm cell and from which the sodium chloride can be crystallized out by partial evaporation of water. Chlorine gas is liberated at the anode, and hydrogen gas is liberated at the cathode.

The ratio of high purity to lower purity caustic soda from the three compartment cell may be varied by the use of permselective membranes of different degrees of selectivity according to the desired purity of product. Capital investment in caustic-chlorine plants can be reduced by the installation of three compartment cells since both extremely pure caustic and lower grade caustic can be produced in a single apparatus. The so-called rayon grade caustic soda can be manufactured in the present apparatus without the extensive purification processes required to remove contaminants from diaphragm grade caustic. At the same time diaphragm grade caustic soda from the apparatus of this invention can be used where a high degree of purity is not required.

This invention will be more fully understood from the following detailed description of representative embodiments of the invention wherein reference is made to the drawings in which.

Figure 1:
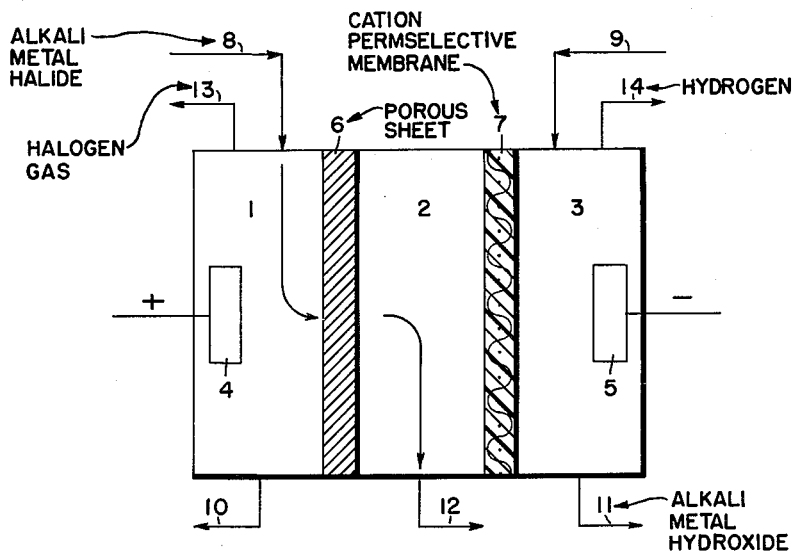
FIG. 1 is a schematic diagram of a three-compartment cell.

In FIG. 1 the three-compartment cell comprising this invention consists of an anode chamber 1, center chamber 2, and a cathode chamber 3. The anode 4 may be an ordinary graphic anode such as is used in a well known diaphragm-type caustic cell while the cathode 5 may be a heavy mild steel grid or other well known cathodic material.

A porous fluid permeable diaphragm 6, preferably asbestos, separates the anode chamber 1 from the center chamber 2 and permits flow of the anolyte liquid from the anode chamber to the center chamber, the arrows showing generally the direction of fluid flow. Separating the center chamber from the cathode chamber is a cation permselective membrane, comprising a solid polymeric structure preferably reinforced by an embedded mat, sheet, cloth, or screen. A permselective membrane containing carboxylate groups fixed into its polymeric matrix is found to be most satisfactory for use in highly basic solutions.

A saturated sodium chloride brine, for example 300–310 grams per liter (about 5 N) is fed into the anode chamber through conduit 8 while a stream of water or other aqueous electrolyte solution enters the cathode chamber through conduit 9. When an electric current is initially applied to the cell, the resistance is comparatively high until the sodium ion concentration is sufficient to conduct the electric current satisfactorily, a period of but a few minutes. The brine flow rate then is controlled so that substantially all the anolyte is transferred through the porous asbestos diaphragm into the center chamber. However should the diaphragm clog or the influent flow exceed the flow through the diaphragm, the excess anolyte in the anode chamber may be removed therefrom through conduit 10. From the cathode chamber 3 high purity, rayon grade caustic soda solution is continuously withdrawn through conduit 11, and a caustic soda-sodium chloride solution of very nearly the same construction as that obtained from a diaphragm cell, for example (about 3 N NaOH and 3 N NaCl), is the effluent from the center chamber through conduit 12. Chlorine gas is given off at the anode 4 and is withdrawn from the anode compartment through conduit 13. Hydrogen given off at the cathode 5 is withdrawn from the cathode compartment through conduit 14.

Figure 2:
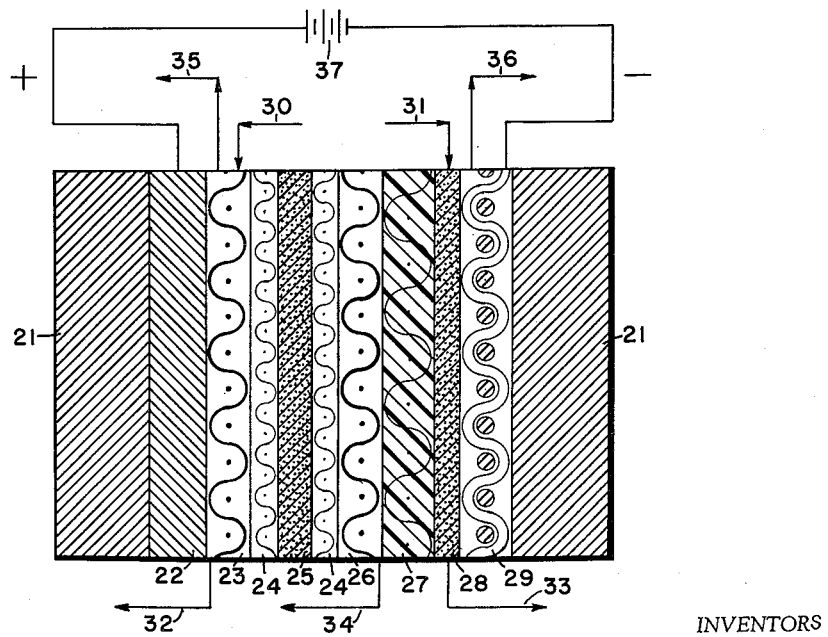
FIG. 2 is a vertical cross section of a preferred embodiment of a three-compartment cell wherein the piping is shown schematically.

FIG. 2 is a vertical cross-sectional view of a preferred type of three compartment cell in which the three compartments are disposed between two end plates 21. The anode 22 may be an ordinary graphite anode of the type used in diaphragm-caustic soda cells. A three-dimensional, open weave, screen spacer 23 of vinylidine chloride copolymer with a small amount of a comonomer, such as Saran or like chemically inert material, provides suitable support for the fluid permeable porous asbestos diaphragm 25 and permits free flow of liquid from the anode chamber through the diaphragm. A three-dimensional, open weave screen spacer 26, similarly of Saran or like inert material, comprises the center compartment of the cell. Spacer 26 permits liquid to flow from the anode chamber through the porous diaphragm into the center chamber. When direct current is passed through the cell, cations from the brine in the center chamber are transferred through the cation permselective membrane 27 into a porous asbestos mat spacer 28. The membrane 27 preferably contains carboxylate groups fixed into its polymeric matrix and is reinforced by asbestos fibers embedded in the polymeric structure. The porous asbestos mat spacer 28 separates the permselective membrane from the cathode 29 which is preferably a heavy steel wire grid. The porous asbestos mat spacer 28 through which the catholyte flows is in contact with the cathode and is included in the cathode chamber of the cell.

A saturated sodium chloride brine, for example 300–310 grams of NaCl per liter (5 N), is fed into the anode chamber through conduit 30 while water enters the cathode chamber through conduit 31. The brine flow rate is controlled so that substantially all of the anolyte is transferred through the porous asbestos diaphragm into the center chamber. Excess anolyte which has not flowed into the center chamber is removed from the anode chamber through conduit 32. From the cathode chamber high purity caustic soda solution is continuously withdrawn through conduit 33, and a low grade caustic soda-salt solution is withdrawn from the center compartment through conduit 34 and subjected to concentration and purification for the removal of salt. Chlorine gas is given off at the anode 22 and is withdrawn from the anode chamber through conduit 35. Hydrogen given off at the cathode 29 is withdrawn from the cathode compartment through conduit 36. A direct current source 37 is connected to the cell, the positive lead being connected to the anode and the negative lead to the cathode.

Ion-exchange materials which can be formed into permselective membranes are well known per se. In the polymeric structure of these materials ionizable radicals are fixed into the polymeric matrix which fixed ions repel ions of the like sign and attract mobile ions of the opposite sign, such ions becoming electrically associated with the fixed ions. Under the influence of an electric current, ions having a charge which is the same as the mobile ions attracted by the fixed radicals permeate the material while ions of the opposite charge are repelled. Such polymeric materials can be formed into electrically conductive, permselective membranes which may be used effectively in electrolytic cells. It has been observed that membranes composed of polymers having carboxylate groups fixed into the polymeric matrix are the most effective cation permselective membranes that can be employed in the present invention.

Copolymers of divinyl benzene and an olefinic carboxylic compound possess ion-exchange characteristics and can be formed into cation permselective membranes as disclosed in U.S. Patent No. 2,731,408. Carboxylic membranes, per se, are manufactured by copolymerizing divinyl benzene and an olefinic carboxylic compound such as an anhydride, ester or acid chloride of acrylic acid and its derivatives in solution in a suitable solvent. The polymerized solid material is saturated with water or an aqueous solution of an acid or base to convert the anhydride, ester or acid groupings in the polymeric matrix to salt or acid forms of carboxylate groups (—COO— or —COOH). The polymerized solids are most useful where the solvent of polymerization in the polymerized solid is replaced by water. The presence of an aqueous solvent phase in the polymerized solid provides a solid structure which is electrically conductive and selectively permeable to cations.

In the present invention cation permselective membranes of high selectively are desired because the production of pure caustic soda in the cathode chamber is determined by the degree to which hydroxyl ions are prevented from migrating through the membrane. For example if the carboxylic membrane is 75% selective then only one mol of hydroxyl ions is transferred into the center chamber for every four moles of hydroxyl ions produced at the cathode. Also, it is desired to exclude hydroxyl ions from the anode compartment where their presence causes anode deterioration. The permselective membrane serves to reduce the migration of hydroxyl ions from the cathode chamber to the anode chamber by selectively excluding them from the center compartment.

While the permselective membrane in the electrolytic cell of this invention must allow sodium ions to be transferred into the cathode chamber, it also must provide resistance to migration of hydroxyl ions from the cathode compartment to the center chamber. A basic solution is necessary to ionize the carboxyl groups in the polymeric matrix, and these groups must be ionized to make the membrane permselective. The carboxyl groups are ionized by hydroxyl ions which diffuse into the polymeric structure. It is evident that to ionize the carboxylate groups in a membrane having a high concentration of carboxyl groups in its polymeric matrix, large numbers of hydroxyl ions must diffuse into the structure. Hence with a high concentration of hydroxyl ions in the cathode chamber and a relatively high rate of diffusion into the membrane structure to ionize fixed groups it would be expected that the membrane would have a low degree of selectivity; that is, it would seem that a large proportion of the hydroxyl ions would be transferred through the membrane into the center compartment. Consequently it is a unique and unexpected result that carboxylic membranes having a high concentration of fixed groups would have a high degree of selectivity in a strongly basic solution for example 10 N NaOH.

Coherent, physically stable membranes of ion-exchange materials can be prepared by impregnating reinforcing webs or screens of Saran, Vinyon, glass cloth, or like material with the ion-exchange materials before polymerization as disclosed in U.S. Patent 2,636,851. Reinforcing materials which do not interfere with polymerization may be included in molds or casts wherein a solution of polymerizable compounds is polymerized. This completed membrane must be highly conductive and resistant to the corrosive action of strong base in a caustic cell.

It has been observed that reinforcing materials such as Saran and polyethylene, are attacked by strong base, resulting in deterioration of the membrane. However, an asbestos mat or cloth is found to be a suitable reinforcing material which can be impregnated with the unpolymerized solution of divinyl benzene and olefinic carboxylic compound. Polymerization is subsequently carried out under prescribed conditions preventive of escape of solvent. It is surprising that asbestos proved to be a conductive reinforcing material for permselective membranes that would provide adequate mechanical stability in a caustic cell since it is well known that silicates generally interfere with the vinyl polymerization of carboxylate copolymers. In addition a synergistic effect in polymerizing copolymers of divinyl benzene and olefinic carboxylic compounds on a reinforcement of asbestos was noted. An asbestos mat has a low mechanical strength when wet while the carboxylic resin is not mechanically durable without reinforcement. However, when an asbestos mat is impregnated with a copolymer containing carboxylate groups, a structurally strong membrane is formed that retains its strength and durability when wet. Asbestos resists the attack of strongly basic solutions in the three compartment cell and therefore is a stable reinforcing material for permselective membranes in a caustic cell.

In operation of a three-compartment caustic cell as shown in FIG. 1 and FIG. 2, concentrated sodium chloride brine, for example 300–310 grams per liter (5 N NaCl) is fed into the anode chamber 1. Since the anode and center compartments act essentially as a diaphragm caustic-chlorine cell, the influent brine should be pretreated by means well known, per se, to remove calcium, magnesium, iron and aluminum which would otherwise clog the porous asbestos diaphragm. Calcium is ordinarily precipitated out of the brine as the carbonate while magnesium, iron and aluminum are removed as hydroxides. The purified influent brine should preferably be concentrated in order to minimize oxidation of the graphite anode.

The graphite anode of a diaphragm caustic cell is corroded by products of oxidation which result from the rather complex chemical and electrochemical reactions taking place in the anolytes and catholyte solution and at the anode. A function of the asbestos diaphragm in the present invention is to keep the cell products, caustic soda and hydrogen separated from chlorine. The graphite anode is also attacked by oxygen liberated when hydroxyl ions migrate to the anode as shown by the equation for a half-cell:

$$2OH^- - 2e = H_2O + O$$

The asbestos diaphragm also serves to preclude diffusion of hydroxyl ions from the center chamber into the anode chamber. A hydrostatic head equivalent to a pressure differential of about 1 p.s.i. is maintained between the anode compartment and the center compartment to assure a continuous flow of anolyte through the asbestos diaphragm into the center chamber. Hydroxyl ions in the center compartment attracted toward the anode are swept back by the anolyte flow through the diaphragm.

Influent brine feed can be regulated so that substantially all of the anolyte is transferred through the porous diaphragm into the center chamber. Excess anolyte can be drawn off from the anode chamber if influent flow exceeds the transfer through the diaphragm. Since asbestos is resistant to attack by the basic solution in the center compartment and dissolved chlorine in the anode chamber it has been found to be the most suitable material for the porous diaphragm defining the anode and center compartments.

The application of a direct current to the electrodes of the cell causes the sodium ions in the brine to migrate toward the cathode through the permselective carboxylic membrane. The hydroxyl ions in the cathode chamber tend to migrate toward the anode but are substantially excluded by the permselective membrane. However, as outlined above, the membrane is not 100% selective and a fraction of the hydroxyl ions, for example 25%, is transferred into the center compartment. The hydroxyl ions mingle with the sodium and chloride ions in the influent brine of the center compartment to form a mixed solution of sodium chloride and sodium hydroxide; the effluent from the center compartment contains significant concentrations of both sodium chloride and sodium hydroxide, for example 3 N concentration of each. The salt is crystallized out of the mixed solution by evaporating the center effluent to 50% caustic by means well known in the production of caustic soda from diaphragm cells. The diaphragm grade 50% caustic thus produced contains approximately 1% impurities.

The effluent liquid from the cathode compartment is pure rayon grade caustic, the concentration of which can be altered by varying the rate of feed water to the cathode chamber. Although not shown in the drawing of FIG. 1, the cathode may also be placed in contact with a porous asbestos mat. Liquid in the cathode compartment flows freely through the porous asbestos mat spacer. It is understood that a porous spacer of any material that is not attacked by caustic would be suitable to separate the cathode 5 from the permselective membrane 7.

Current density in the cell is determined by the power consumption per unit of product, for while higher current densities give greater production, higher power costs may obviate such advantages. Current density does not appear to affect membrane life appreciably.

Brine feed rate into the anode compartment depends upon two limitations. If the feed rate is too low, hydraulic flow through the asbestos diaphragm will be insufficient to sweep back all the hydroxyl ions in the center compartment that are attracted to the anode. Oxygen will then be formed by electrolytic reaction of hydroxyl ions at the anode, and the graphite anode will be attacked. On the other hand if the brine feed rate is too high, chlorine will be swept into the center chamber where it reacts with hydroxide to form hypochlorite which in turn reacts further to form sodium chlorate in the caustic product. Chlorate impurity may be removed from 50% caustic solution by known procedures if its concentration exceeds allowable limits. In addition to the possible transfer of hydroxyl ions or chlorine through the asbestos diaphragm it is apparent that it is desirable to minimize the total flow of influent liquid in order to minimize subsequent evaporation and concentration of the caustic product.

Efficiency of the cell is increased by operating at a temperature of about 95–99° C. Resistance of the cell decreases with an increase in temperature, resulting in lower power consumption at temperatures approaching the boiling point of water.

The following examples will serve to illustrate the principles and preferred embodiments of this invention, but it is understood that the invention is not limited thereto except as claimed.

EXAMPLE I

*Preparation of a carboxylic, permselective membrane for a three-compartment caustic cell*

To 310 cc. of inhibitor-free 74.6% divinyl benzene were added 457 cc. of acrylic acid and 233 cc. of diethyl benzene. 9.0 grams of benzoyl peroxide was added to the liquid as a catalyst. The liquid solution was poured into a Teflon-coated, seamless steel tray. Asbestos mats approximately 0.05 inch thick disposed between glass plates were then placed in the tray thereby impregnating the asbestos reinforcing material with the solution. The mixture was polymerized and cured in an oven for 17 hours, temperature being increased from 70° C. to 80° C. over the period. After cooling, the glass plates were removed and the polymeric membranes removed. The polymeric membrane is then stored in a saturated aqueous solution of sodium chloride made basic with NaOH to a pH of about 10. In the storate bath, the solvent of polymerization is replaced by water, and the carboxylate groups in the polymeric matrix ionize in the basic solution.

EXAMPLE II

*Production of caustic in a three-compartment cell using a carboxylic membrane and relatively high flow rate of influent brine*

In a three-compartment caustic cell of the type described above wherein a carboxylic cation-selective membrane of the type prepared in Example I was used, a saturated sodium chloride solution about 5 N NaCl was continuously fed into the anode compartment at a rate of about 80 ml./min. Water was continuously fed into the cathode chamber at a rate of about 15 ml./min. A hydrostatic head between anode and center compartments equivalent to about 1 p.s.i. forced the influent brine through the porous asbestos diaphragm into the center compartment.

A direct electric current at 120 amps. and 4.3 volts was passed through the cell to maintain a current density of 85 amperes per sq. ft. Sodium ions from the center chamber were transferred through the carboxylic cation-selective membrane into the cathode compartment. Chlorine is given off at the anode, and hydrogen at the cathode. Since the membrane is not 100% selective, a small proportion of hydroxyl ions from the cathode chamber migrated through the membrane into the center compartment.

The effluent from the cathode compartment was about 3.7 N NaOH at a rate of 10 ml./min.; the cathode effluent contained 0.1% NaCl on the basis of a 50% caustic soda solution. From the center compartment a solution of about 3 N NaCl and 3 N NaOH at 16 ml./min. was obtained. The influent flow rate of sodium chloride brine was greater than the flow rate into the center compartment, hence an anode effluent was drawn off at about 70 ml./min.

EXAMPLE III

*Production of caustic in a three-compartment cell using a carboxylic membrane and a lower flow rate of influent brine*

A saturated sodium chloride solution about 5 N NaCl was fed into the anode compartment of a three-compartment caustic cell as described above at a rate of about 33 ml./min. Feed water was introduced into the cathode compartment at about 20 ml./min. A pressure differential between the anode compartment and the center compartment of about 1 p.s.i. created a continuous flow of brine through the asbestos diaphragm into the center compartment.

To maintain a current density of 85 amperes per sq. ft., a direct current of 120 amps. at 4.75 volts was passed through the cell. Sodium ions from the center compartment were transferred through the ion-selective carboxylic membrane into the cathode compartment. Chlorine gas was liberated at the anode while hydrogen gas came off at the cathode. With liberation of hydrogen at the cathode the concentration of hydroxyl ions in the cathode compartment increased, and a small proportion migrated through the membrane toward the anode.

The effluent from the center compartment, a solution of sodium chloride and caustic, was found to be about 1 N NaOH and 4 N NaCl. The effluent flow rate from the center compartment was about 33 ml./min., substantially the same as the rate of influent brine. Since substantially all the influent brine to the anode compartment was transferred through the asbestos diaphragm into the center compartment, there was practically no anode effluent.

From the cathode compartment an effluent of about 2.3 N NaOH, containing 0.2% NaCl on the basis of 50% caustic, at a rate of about 18 ml./min. was obtained. At the lower flow rate of influent brine, as in Example III the selectivity of the membrane was about 67% whereas at higher brine flow rates in Example II, the membrane was approximately 55% selective.

In the above description of the invention caustic soda and sodium chloride brine were employed to exemplify a specific and important member of the generic group of alkali metal hydroxides and alkali metal chlorides. It is to be understood, however, that other members of these classes of compounds are included in the disclosure, such as potassium and lithium hydroxides and potassium and lithium chloride brines.

It is understood that the present disclosure is for the purpose of illustration only and that this invention includes all modifications and equivalents which fall within the scope of the appended claims.

What is claimed is:

1. The method of producing alkali metal hydroxide comprising passing an aqueous solution of an alkali metal halide into the anode compartment of a three-compartment electrolytic cell having an anode compartment separated from the center compartment by a fluid permeable porous diaphragm and the center compartment separated from the cathode compartment by a cation permselective membrane, maintaining a greater hydraulic pressure in the anode compartment than in the center compartment, thus causing said alkali metal halide solution to flow from the anode compartment through said porous diaphragm into the center compartment, introducing water into the cathode compartment, passing a direct current through said compartments to cause migration of cations from the center compartment into the cathode compartment, withdrawing an aqueous solution of alkali metal hydroxide from the cathode compartment, withdrawing an aqueous solution of a mixture of an alkali metal hydroxide and alkali metal halide from the center compartment, and recovering the halogen of said halide from the anode compartment.

2. The method of claim 1 wherein the alkali metal hydroxide is sodium hydroxide, and the alkali metal halide is sodium chloride.

3. The method of claim 1 wherein the cations are transferred from the center compartment into the cathode compartment through a cation permselective membrane comprising a copolymer of divinyl benzene and an olefinic carboxylic compound reinforced by an embedded asbestos sheet.

4. In the method of producing alkali metal hydroxide comprising passing alkali metal chloride brine into the anode compartment of a three-compartment electrolytic unit having an anode compartment separated from the center compartment by a porous asbestos diaphragm and the center compartment separated from the cathode compartment by a cation permselective membrane, wherein an aqueous electrolyte solution is passed into the cathode compartment maintaining a greater pressure in the anode compartment than in the center compartment, passing a direct current through said compartments, and withdrawing aqueous solutions of alkali metal hydroxide from the cathode and center compartments, the improvement comprising; transferring cations from the center compartment into the cathode compartment through a cation permselective membrane comprising a solid polymeric matrix with at least 1 meq. per dry gram of membrane of carboxylate groups fixed into said matrix, said membrane being reinforced by an embedded non-corrodible material.

5. A three-compartment electrolytic apparatus for producing alkali metal hydroxide comprising an anode compartment, a center compartment, and a cathode compartment, the anode compartment being separated from the center compartment by a porous non-selective diaphragm, the center compartment being separated from the cathode compartment by a cation permselective membrane, said membrane comprising a solid polymeric structure reinforced by an embedded non-corrodible material, inlet means for passing alkali metal chloride brine into the anode compartment, means for maintaining a pressure in the anode compartment greater than the pressure in the center compartment to effect the transfer of said alkali metal chloride brine through said porous diaphragm into said center compartment, means for passing an aqueous electrolyte solution into the cathode chamber, means for passing a direct current transversely through said compartments, and outlet means for withdrawing aqueous solutions of alkali metal hydroxide from the cathode and center compartments.

6. The apparatus of claim 5 wherein the embedded non-corrodible reinforcing material of the cation-selective membrane is an asbestos sheet.

7. The apparatus of claim 5 wherein the porous diaphragm separating the anode compartment from the center compartment is a porous asbestos diaphragm.

8. An apparatus for producing sodium hydroxide comprising a three-compartment electrodialysis cell having an anode compartment, a center compartment, and a cathode compartment, the anode compartment being separated from the center compartment by a porous asbestos diaphragm, the center compartment being separated from the cathode compartment by a cation permselective membrane, means for passing sodium chloride brine into the anode compartment, means for maintaining a pressure in the anode compartment greater than the pressure in the center compartment, means for passing a feed stream into the cathode compartment, means for passing a direct current through said compartments, and means for withdrawing sodium hydroxide from the cathode and center compartments, said cation-selective membrane comprising a solid polymeric matrix with at least 1 meq. per dry gram of membrane of carboxylate groups fixed into said matrix and reinforced by an embedded non-corrodible material.

9. The apparatus of claim 8 wherein the embedded non-corrodible reinforcing material of the cation-selective membrane comprises an asbestos sheet.

10. A three-chamber electrodialysis apparatus for producing alkali metal hydroxide comprising an end anode and anode chamber, an end cathode and cathode chamber, said anode chamber comprising a three-dimensional, open-weave, plastic screen spacer, said cathode chamber comprising a porous asbestos diaphragm separating said anode chamber from the center chamber, said porous asbestos diaphragm being supported on both sides by a loose weave plastic screen, said center chamber comprising a three-dimensional, open-weave, plastic screen spacer, a cation permselective membrane separating said center chamber and said cathode chamber, two end plates between which said electrodes, chambers, diaphragm and membrane are disposed, means for passing alkali metal chloride brine into the anode compartment, means for passing an aqueous electrolyte solution into said cathode chamber, means for maintaining a pressure in said anode chamber greater than the pressure in said center chamber, means for passing a direct electric current through said chambers, and means for withdrawing aqueous solutions of alkali metal hydroxide from the cathode and center chambers.

11. The apparatus of claim 10 wherein the cation permselective membrane comprises a copolymer of divinyl benzene and an olefinic carboxylic compound in which at least 1 meq. per dry gram of membrane of carboxylate groups are fixed into the polymeric matrix, said copolymer being reinforced by an embedded non-corrodible material.

12. The apparatus of claim 11 wherein the copolymer of divinyl benzene and an olefinic carboxylic compound is reinforced by an embedded asbestos sheet.

13. The method of claim 4 wherein the non-corrodible material is a sheet of asbestos.

References Cited in the file of this patent

UNITED STATES PATENTS

| | | |
|---|---|---|
| 1,126,627 | Gaus | Jan. 26, 1915 |
| 2,245,831 | Silsby | June 17, 1941 |
| 2,681,320 | Bodamer | June 15, 1954 |
| 2,723,229 | Bodamer | Nov. 8, 1955 |
| 2,784,158 | Bodamer et al. | Mar. 5, 1957 |
| 2,827,426 | Bodamer | Mar. 18, 1958 |
| 2,848,402 | De Hass Van Dorsser | Aug. 19, 1958 |
| 2,881,124 | Tye | Apr. 7, 1959 |

FOREIGN PATENTS

| | | |
|---|---|---|
| 764,067 | Great Britain | Dec. 19, 1956 |
| 764,181 | Great Britain | Dec. 19, 1956 |